(12) United States Patent
Xu et al.

(10) Patent No.: US 8,855,630 B2
(45) Date of Patent: Oct. 7, 2014

(54) ENHANCED MULTIPLEXING SYSTEM AND TECHNIQUE FOR UPLINK CONTROL CHANNELS

(75) Inventors: Hao Xu, San Diego, CA (US); Durga Prasad Malladi, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 12/365,845

(22) Filed: Feb. 4, 2009

(65) Prior Publication Data

US 2009/0201869 A1   Aug. 13, 2009

Related U.S. Application Data

(60) Provisional application No. 61/027,242, filed on Feb. 8, 2008.

(51) Int. Cl.
    *H04W 4/00*   (2009.01)
(52) U.S. Cl.
    USPC ......................................................... 455/434
(58) Field of Classification Search
    USPC .................. 370/329–330, 341–345, 347–348; 455/434, 450–452.1, 452.2
    See application file for complete search history.

(56) References Cited

U.S. PATENT DOCUMENTS

| | | | |
|---|---|---|---|
| 6,970,438 B2 * | 11/2005 | Mate et al. | ..................... 370/329 |
| 7,042,856 B2 | 5/2006 | Walton et al. | |
| 7,158,504 B2 | 1/2007 | Kadaba et al. | |
| 7,321,780 B2 | 1/2008 | Love et al. | |
| 7,613,144 B2 | 11/2009 | Malladi et al. | |

(Continued)

FOREIGN PATENT DOCUMENTS

| CN | 1491498 A | 4/2004 |
|---|---|---|
| JP | 2006033778 A | 2/2006 |

(Continued)

OTHER PUBLICATIONS

Alcatel-Lucent "Multiplexing the Scheduling Request in the Uplink" 3GPP Draft; R1-074276_Mux_SRS, 20071002 3rd Generation Partnership Project (3GPP), Mobile Competence Centre ; 650, route des Lucioles ; F-06921 Sophia-Antipolis Cedex ; France ,vol. RAN WG1, Nr:Shanghai, China; 20071002, XP050107795.

(Continued)

*Primary Examiner* — Brandon Miller
(74) *Attorney, Agent, or Firm* — Paul Kuo

(57) ABSTRACT

A communication system incorporates a multiplexing scheme so that a base node that schedules user equipment (UE) can determine whether an ACK/NACK and/or a service request (SR) has been received when both uplink (UL) transmissions are simultaneously scheduled. Significant complexity reduction, better link efficiency, and higher multiplexing capability since the base node can interpret selective use by the UE of either the ACK/NACK or SR UL channel. Such interpretation can be extended to when multiple downlink (DL) transmission modes can be used, specifically DL single input multiple output (SIMO), DL multiple input multiple output (MIMO) with rank 1 transmission, and DL MIMO with rank 2 transmission. Based upon knowledge of the scheduling and DL transmission mode, the base node does not have to blind decode a number of possibilities due to the mapping of possible responses from the UE. In addition, the multiplexing scheme is applicable to FDD and TDD.

15 Claims, 12 Drawing Sheets

(56) References Cited

U.S. PATENT DOCUMENTS

| | | | |
|---|---|---|---|
| 7,616,698 B2* | 11/2009 | Sun et al. | 375/267 |
| 7,680,206 B2* | 3/2010 | Tujkovic et al. | 375/267 |
| 7,760,812 B2* | 7/2010 | Liu et al. | 375/260 |
| 7,916,621 B2* | 3/2011 | Khan et al. | 370/204 |
| 8,102,802 B2* | 1/2012 | Ratasuk et al. | 370/329 |
| 2005/0250497 A1 | 11/2005 | Ghosh et al. | |
| 2005/0281221 A1* | 12/2005 | Roh et al. | 370/328 |
| 2006/0133522 A1 | 6/2006 | Sutivong et al. | |
| 2006/0182065 A1 | 8/2006 | Petrovic et al. | |
| 2007/0047451 A1 | 3/2007 | Lohr et al. | |
| 2007/0064708 A1 | 3/2007 | Usuda et al. | |
| 2008/0080635 A1* | 4/2008 | Hugl et al. | 375/267 |
| 2008/0186934 A1* | 8/2008 | Khan et al. | 370/342 |
| 2008/0268785 A1* | 10/2008 | McCoy et al. | 455/67.11 |
| 2008/0298482 A1* | 12/2008 | Rensburg et al. | 375/260 |
| 2008/0316959 A1* | 12/2008 | Bachl et al. | 370/329 |
| 2009/0067531 A1* | 3/2009 | Lee et al. | 375/267 |

FOREIGN PATENT DOCUMENTS

| | | |
|---|---|---|
| JP | 2010536226 A | 11/2010 |
| JP | 2011502415 A | 1/2011 |
| RU | 2006114668 A | 11/2007 |
| TW | M314881 U | 7/2007 |
| WO | 2009056599 A2 | 5/2009 |

OTHER PUBLICATIONS

International Search Report and Written Opinion—PCT/US2009/033218, International Search Authority—European Patent Office—Oct. 7, 2009.

Motorola: "E-UTRA Uplink L1/L2 Control Channel Mapping" 3GPP Draft; R1-062626 UL L1L2 Control Mapping, 3rd Generation Partnership Project (3GPP), Mobile Competence Centre; 650, Route Des Lucioles; F-06921 Sophia-Antipolis Cedex; France, vol. RAN WG1, No. Seoul, Korea; 20061004, Oct. 4, 2006, XP050103126.

Nokia Siemens Networks Nokia: "Multiplexing of Scheduling Request with ACK/NACK and/or CQI", 3GPP Draft; R1-080312, 20080108 3rd Generation Partnership Project (3GPP), Mobile Competence Centre; 650, route des Lucioles; F-06921 Sophia-Antipolis Cedex; France, vol. RAN WG1,Nr:Sevilla, Spain; 20080108, XP050108833.

Motorola, "ACK/NACK and SR Multiplexing in PUCCH", R1-080085, 3GPP TSG RAN1#51-Bis, Sevilla, Spain, Jan. 14-18, 2008, pp. 1-2.

Taiwan Search Report—TW098103965—TIPO—Jul. 8, 2012.

Nokia Siemens Networks Nokia: "Multiplexing of Scheduling Request with ACK/NACK and/or CQI", 3GPP Draft; R1-074879, 3GPP TSG RAN WG1 Meeting #51, Jeju, Korea, Nov. 5-9, 2007.

* cited by examiner

ENHANCED MULTIPLEXING SYSTEM AND TECHNIQUE FOR UPLINK CONTROL CHANNELS

CLAIM OF PRIORITY UNDER 35 U.S.C. §119

The present Application for Patent claims priority to Provisional Application No. 61/027,242 entitled "ENHANCED MULTIPLEXING SYSTEM AND TECHNIQUE FOR UPLINK CONTROL CHANNELS" filed Feb. 8, 2008, assigned to the assignee hereof and hereby expressly incorporated by reference herein.

FIELD OF INVENTION

The exemplary and non-limiting aspects described herein relate generally to wireless communications systems, methods, computer program products and devices, and more specifically to techniques for efficiently conveying information for ACK/NAK channel and service request (SR) channel when both are scheduled simultaneously.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers which make up the UMTS radio access network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

For LTE uplink (UL) ACK/NACK channel and service request (SR) channel transmissions, cyclically shifted CAZAC (Constant-Amplitude Zero Auto-Correlation) sequences as well as discrete Fourier transform (DFT) and Walsh spreading, are used to multiplex different users. Problems arise when both channels have to be sent simultaneously.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with providing a predetermined mapping for how ACK, SR or ACK+SR can be multiplexed using one uplink control channel resource when both acknowledgement and service requests are simultaneously scheduled. Thereby, the uplink control channel can be demultiplexed to receive ACK, SR or ACK+SR without blind decoding, link loss through higher order modulation, or additional hardware/software complexity.

In one aspect, a method is provided for transmitting multiplexed uplink control channels by determining that first and second control channels with assigned first and second resources respectively require simultaneous transmission, transmitting a selected one of the first and second control channel with the corresponding one of the first and second resources for indicating the selected one without indicating the unselected one of the first and second control channel, and transmitting a selected one of the first and second control channel with the noncorresponding one of the first and second resources for indicating both of the first and second control channels.

In another aspect, at least one processor is provided for transmitting multiplexed uplink control channels. A module determines that first and second control channels with assigned first and second resources respectively require simultaneous transmission. A module transmits a selected one of the first and second control channel with the corresponding one of the first and second resources for indicating the selected one without indicating the unselected one of the first and second control channel. A module transmits a selected one of the first and second control channel with the noncorresponding one of the first and second resources for indicating both of the first and second control channels.

In an additional aspect, a computer program product is provided for transmitting multiplexed uplink control channels. A computer-readable storage comprises a set of codes for causing a computer to determine that first and second control channels with assigned first and second resources respectively require simultaneous transmission. A set of codes causes the computer to transmit a selected one of the first and second control channel with the corresponding one of the first and second resources for indicating the selected one without indicating the unselected one of the first and second control channel. A set of codes causes the computer to transmit a selected one of the first and second control channel with the noncorresponding one of the first and second resources for indicating both of the first and second control channels.

In another additional aspect, an apparatus is provided for transmitting multiplexed uplink control channels. Means are provided for determining that first and second control channels with assigned first and second resources respectively require simultaneous transmission. Means are provided for transmitting a selected one of the first and second control channel with the corresponding one of the first and second resources for indicating the selected one without indicating the unselected one of the first and second control channel. Means are provided for transmitting a selected one of the first and second control channel with the noncorresponding one of the first and second resources for indicating both of the first and second control channels.

In a further aspect, an apparatus is provided for transmitting multiplexed uplink control channels. A computing platform determines that first and second control channels with assigned first and second resources respectively require simultaneous transmission. A transmitter transmits a selected one of the first and second control channel with the corresponding one of the first and second resources for indicating the selected one without indicating the unselected one of the first and second control channel, wherein the transmitter is further for transmitting a selected one of the first and second control channel with the noncorresponding one of the first and second resources for indicating both of the first and second control channels.

In yet one aspect, a method is provided for receiving multiplexed uplink control channels by determining that first and second control channels with assigned first and second resources respectively require simultaneous transmission, receiving a selected one of the first and second control channel with the corresponding one of the first and second resources for indicating the selected one without indicating the unselected one of the first and second control channel, and receiving a selected one of the first and second control channel with the noncorresponding one of the first and second resources for indicating both of the first and second control channels.

In yet another aspect, at least one processor is provided for receiving multiplexed uplink control channels. A module determines that first and second control channels with assigned first and second resources respectively require simultaneous transmission. A module receives a selected one of the first and second control channel with the corresponding one of the first and second resources for indicating the selected one without indicating the unselected one of the first and second control channel. A module receives a selected one of the first and second control channel with the noncorresponding one of the first and second resources for indicating both of the first and second control channels.

In yet an additional aspect, a computer program product is provided for receiving multiplexed uplink control channels. A computer-readable storage comprises a set of codes for causing a computer to determine that first and second control channels with assigned first and second resources respectively require simultaneous transmission. A set of codes causes the computer to receive a selected one of the first and second control channel with the corresponding one of the first and second resources for indicating the selected one without indicating the unselected one of the first and second control channel. A set of codes causes the computer to receive a selected one of the first and second control channel with the noncorresponding one of the first and second resources for indicating both of the first and second control channels.

In yet another additional aspect, an apparatus is provided for receiving multiplexed uplink control channels. Means are provided for determining that first and second control channels with assigned first and second resources respectively require simultaneous transmission. Means are provided for receiving a selected one of the first and second control channel with the corresponding one of the first and second resources for indicating the selected one without indicating the unselected one of the first and second control channel. Means are provided for receiving a selected one of the first and second control channel with the noncorresponding one of the first and second resources for indicating both of the first and second control channels.

In yet a further aspect, an apparatus is provided for receiving multiplexed uplink control channels. A computing platform determines that first and second control channels with assigned first and second resources respectively require simultaneous transmission. A receiver receives a selected one of the first and second control channel with the corresponding one of the first and second resources for indicating the selected one without indicating the unselected one of the first and second control channel, wherein the receiver is further for receiving a selected one of the first and second control channel with the noncorresponding one of the first and second resources for indicating both of the first and second control channels.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
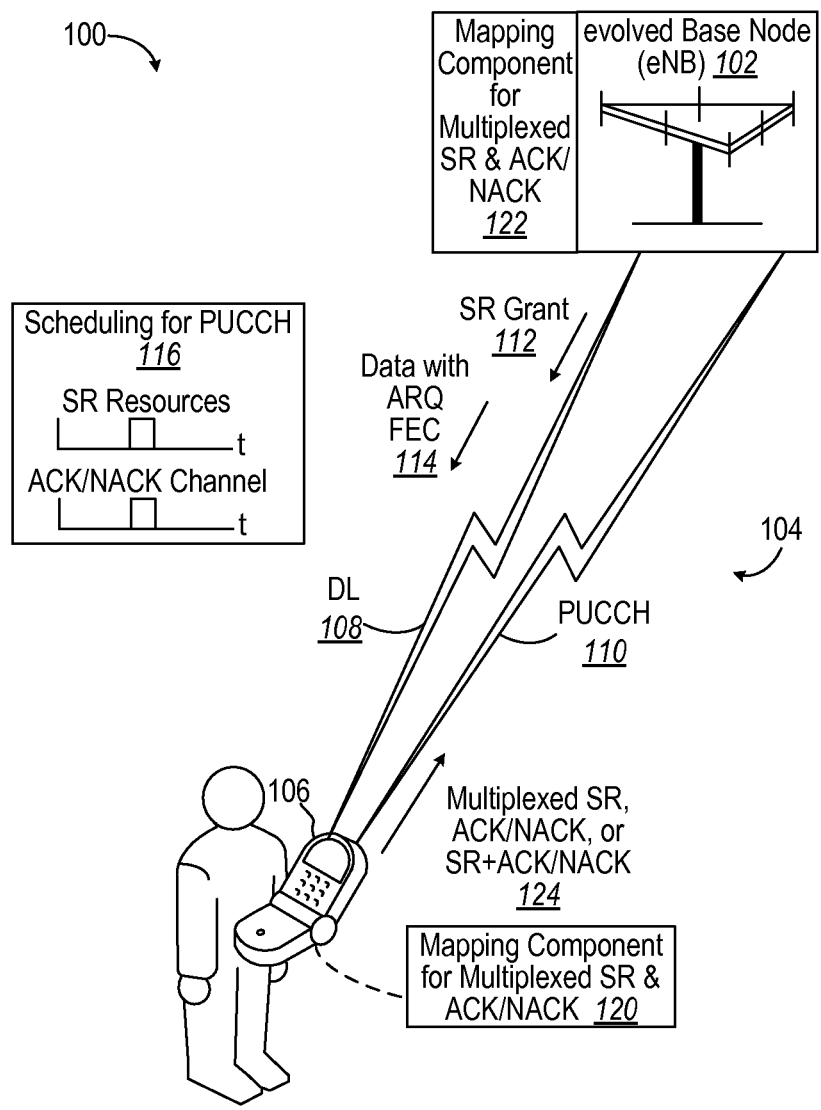
FIG. 1 depicts a block diagram of a communication system for efficient uplink transmission of multiplexed service request and data acknowledgement when simultaneously scheduled.

A communication system incorporates a multiplexing scheme so that a base node that schedules user equipment (UE) can determine whether an ACK/NACK and/or a service request (SR) has been received when both uplink (UL) transmissions are simultaneously scheduled. Significant complexity reduction, better link efficiency, and higher multiplexing capability since the base node can interpret selective use by the UE of either the ACK/NACK or SR UL channel. Such interpretation can be extended to when multiple downlink (DL) transmission modes can be used, specifically DL single input multiple output (SIMO), DL multiple input multiple output (MIMO) with rank 1 transmission, and DL MIMO with rank 2 transmission. Based upon knowledge of the scheduling and the DL transmission mode, the base node does not have to blind decode a number of possibilities due to the mapping of possible responses from the UE. In addition, the multiplexing scheme is applicable to both frequency division duplex (FDD) and time division duplex (TDD). Thereby, less desirable approaches are avoided, such as higher order modulation (e.g., 8 PSK instead of QPSK) that results in link performance loss for edge users, reducing the multiplexing capability (e.g., restricting a maximum ACK channels from 18 to 12), or increasing hardware/software complexity (e.g., requiring blind decoding of ACK versus SR+ACK).

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, a communication system 100 of a base station, depicted as an evolved base node (eNB) 102, communicates via an over-the-air (OTA) link 104 with user equipment (UE) 106. In particular, the eNB 102 utilizes a downlink (DL) 108 to schedule a physical uplink control channel (PUCCH) 110. For instance, a grant 112 for making a service request (SR) on the PUCCH 110 is transmitted on the downlink 108. Thereby, the UE 106 has an opportunity to request resources (e.g., frequency and time) for transmitting data to the eNB 102. The eNB 102 also transmits on the downlink 108 data 114 in accordance with a forward error correction (FEC) method, such as using ARQ (automatic repeat-request) or Hybrid-ARQ (HARQ). The SR grant 112 conveys conflicting scheduling for PUCCH, depicted at 116, with an ACK/NACK channel scheduling that is expected in response to the data 114. In response to this scheduling conflict, a mapping component 120 at the UE 106 transmits and a mapping component 122 at the eNB 102 receives selectively an acknowledgement (ACK), an SR, or an SR+ACK as depicted at 124 on the PUCCH 110.

Figure 2:
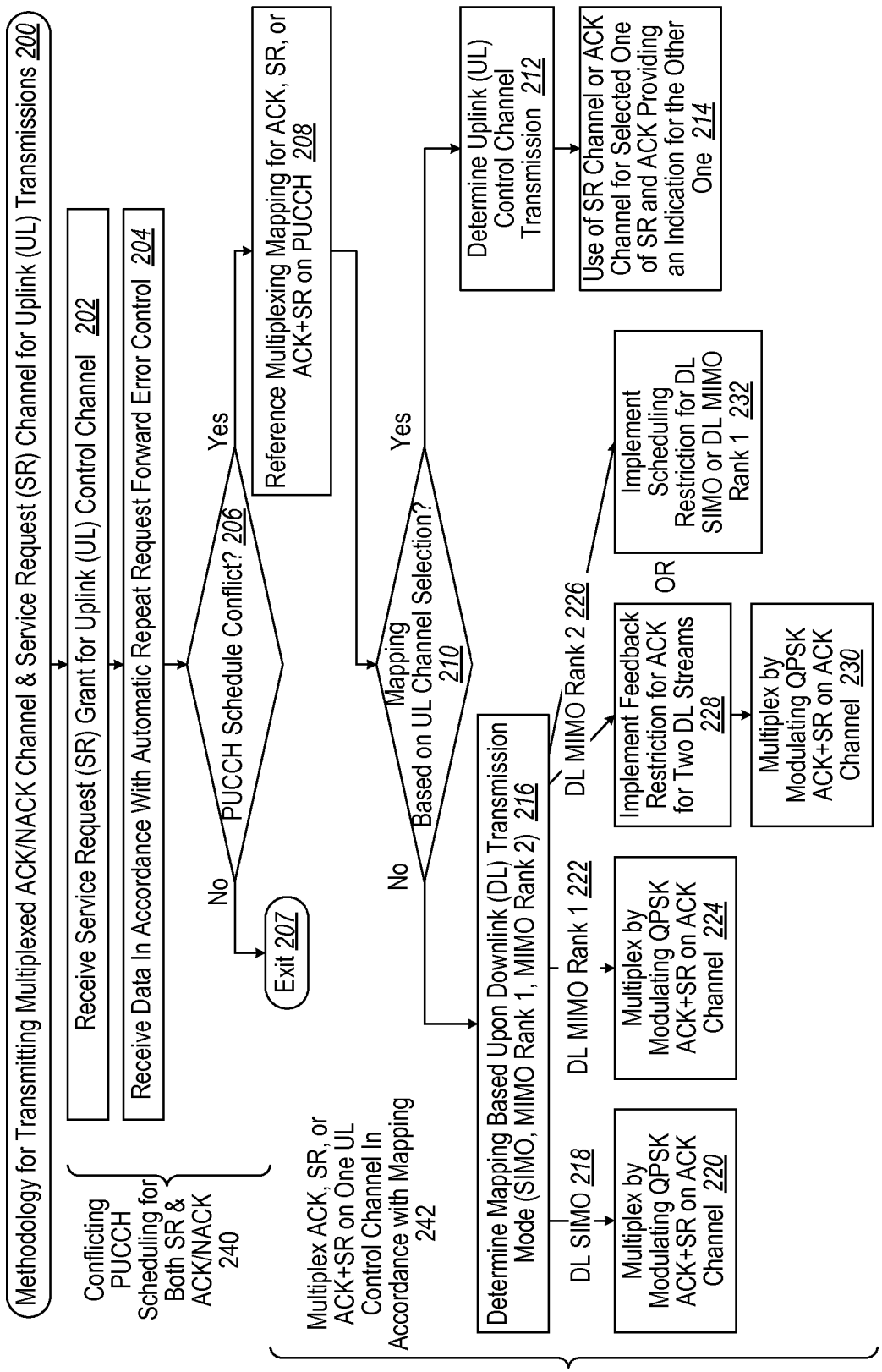
FIG. 2 depicts a flow diagram of a methodology for transmitting multiplexed ACK/NACK channel and service request (SR) channel on an uplink control channel.

In FIG. 2, in one aspect a methodology 200 is provided for transmitting multiplexed ACK/NACK channel and service request (SR) channel for uplink (UL) transmissions. At block 202, a service request grant is received for use of an UL control channel. In addition, data is received in accordance with an automatic repeat-request method (e.g., ARQ, HARQ)

as part of forward error control (FEC) (block 204). If a determination is made in block 206 as to whether a scheduling conflict exists for the PUCCH regarding SR and ACK/NACK for the received data. If not, then multiplexing of SR and ACK is not required and an exit occurs (block 207). If a conflict, then reference is made of mapping for multiplexing ACK, SR, or ACK+SR on PUCCH (block 208).

If the mapping is to be based on uplink (UL) transmission channel selection (block 210), then the appropriate UL control transmission parameters are determined according to the mapping (block 212). In block 214, selective use can be made of either the SR channel or the ACK channel in order to convey SR, ACK or SR+ACK. In an exemplary implementation, transmitting ACK on the ACK channel indicates according to this mapping that there is no SR. Transmitting SR on the SR channel indicates that there is no ACK. However, transmitting a selected one of the SR and ACK on the other channel (e.g., transmitting ACK on SR channel) indicates both SR and ACK If in block 210 that the mapping indicates that UL channel selection is not the means for conveying additional information by mapping, then a determination is made in block 216 as to what downlink (DL) transmission mode is being used as the bases for referencing the appropriate mapping.

As depicted at 218 for DL single input multiple output (SIMO), the multiplexing of both SR and ACK is achieved by quadrature phase-shift keying (QPSK) on the ACK channel (block 220).

As depicted at 222 for DL multiple input multiple output (MIMO) for rank 1 transmission, the multiplexing of both SR and ACK is achieved by QPSK on the ACK channel (block 224).

As depicted at 226 for DL MIMO rank 2 transmission, a feedback restriction is implemented for acknowledging with one ACK receipt of both DL streams (block 228). Multiplexing of both SR and ACK can be achieved by QPSK on the ACK channel (block 230). Alternatively, a scheduling restriction can be implemented to use either, or to specify use of one, DL SIMO or DL MIMO rank 1 (block 232).

Thereby, it should be appreciated that the methodology 200 provides in summary in block 240 for receiving data in accordance with an automatic repeat request forward error control method for data transmission with an associated acknowledgement scheduled to a resource different from the resource assigned for the service request. Further, in block 242 the methodology 200 also provides for multiplexing selectively a service request, an ACK/NACK (acknowledgement/not acknowledged), or a service request and an ACK/NACK on the uplink control channel omitting data that can be reconstructed by mapping.

It should be appreciated with the benefit of the present disclosure that ACK and SR will be assigned to different UL control channel resources. If only one of such channels is transmitted, they are transmitted at their assigned resources. If both ACK and SR need to be transmitted at the same time, due to the single carrier constraint, ACK and SR cannot be simultaneously transmitted from their assigned resources. In one aspect, this situation is addressed by transmitting ACK information on the resource assigned to SR, when the UE wants to send both ACK and SR and by transmitting ACK information on the resource assigned to ACK when the UE does not want send SR. Thereby, based upon the location of the ACK information the recipient knows whether SR has been implicitly transmitted or not.

Figure 3:
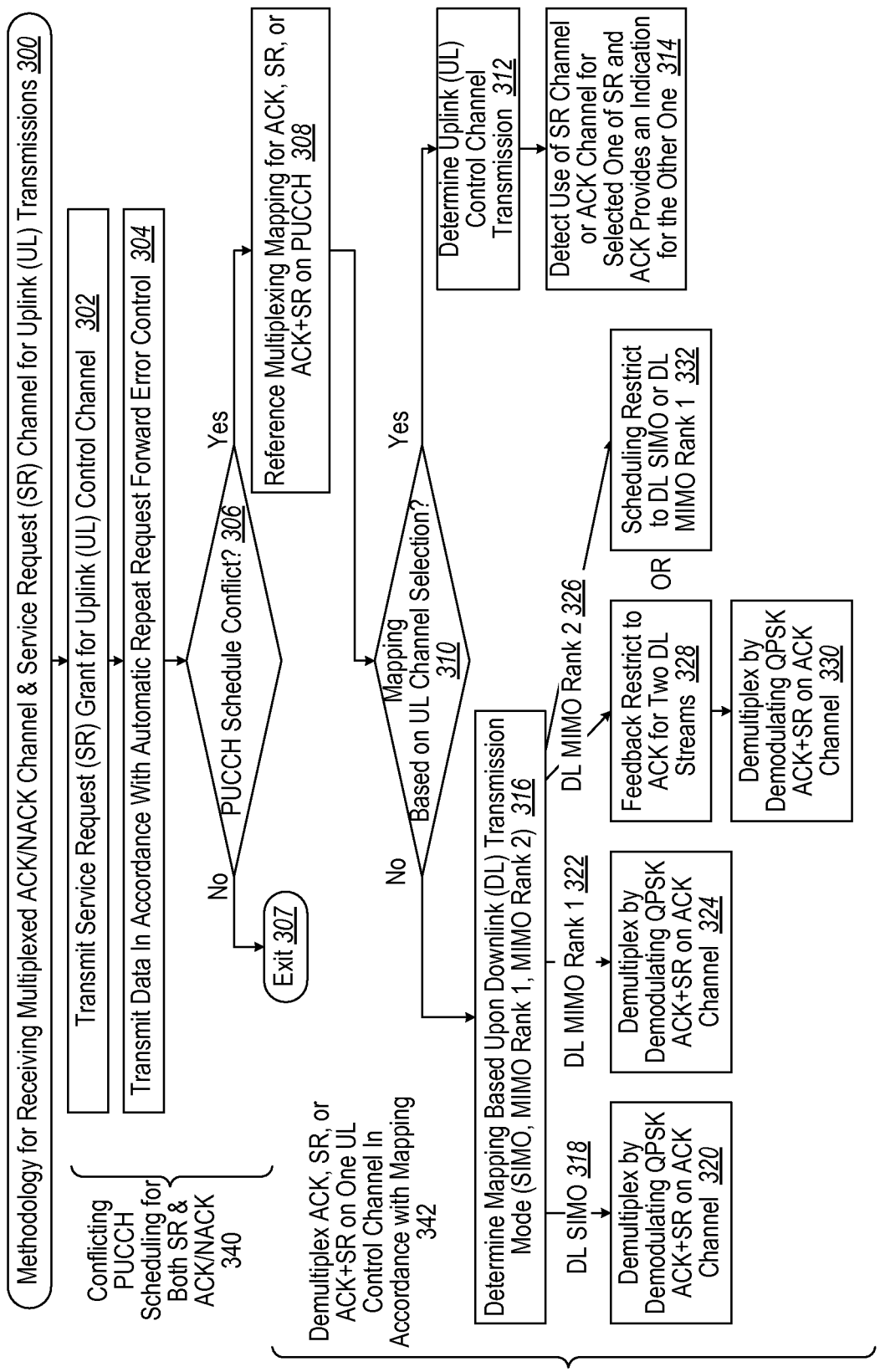
FIG. 3 depicts a flow diagram of a methodology for receiving multiplexed ACK/NACK channel and service request (SR) channel on an uplink control channel.

In FIG. 3, in one aspect a methodology 300 is provided for receiving multiplexed ACK/NACK channel and service request (SR) channel for uplink (UL) transmissions. At block 302, a service request grant is transmitted for use of an UL control channel. In addition, data is transmitted in accordance with an automatic repeat-request method (e.g., ARQ, HARQ) as part of forward error control (FEC) (block 304). If a determination is made in block 306 as to whether a scheduling conflict exists for the PUCCH regarding SR and ACK/NACK for the transmitted data. If not, then multiplexing of SR and ACK is not required and an exit occurs (block 307). If a conflict, then reference is made of mapping for multiplexing ACK, SR, or ACK+SR on PUCCH (block 308).

If the mapping is to be based on uplink (UL) transmission channel selection (block 310), then the appropriate UL control transmission parameters are determined according to the mapping (block 312). In block 314, selective use can be made of either the SR channel or the ACK channel in order to convey SR, ACK or SR+ACK. In an exemplary implementation, receiving ACK on the ACK channel indicates according to this mapping that there is no SR. Receiving SR on the SR channel indicates that there is no ACK. However, receiving a selected one of the SR and ACK on the other channel (e.g., receiving ACK on SR channel) indicates both SR and ACK If in block 310 that the mapping indicates that UL channel selection is not the means for conveying additional information by mapping, then a determination is made in block 316 as to what downlink (DL) transmission mode is being used as the bases for referencing the appropriate mapping.

As depicted at 318 for DL single input multiple output (SIMO), the demultiplexing of both SR and ACK is achieved by demodulating quadrature phase-shift keying (QPSK) on the ACK channel (block 320).

As depicted at 322 for DL multiple input multiple output (MIMO) for rank 1 transmission, the demultiplexing of both SR and ACK is achieved by demodulating QPSK on the ACK channel (block 324).

As depicted at 326 for DL MIMO rank 2 transmission, a feedback restriction has been imposed for acknowledging with one ACK receipt of both DL streams (block 328). Demultiplexing of both SR and ACK can be achieved by demodulating QPSK on the ACK channel (block 330). Alternatively, a scheduling restriction can be imposed to use either, or to specify use of one, DL SIMO or DL MIMO rank 1 (block 332).

Thereby, the methodology 300 provides in summary as depicted at 340 transmitting a resource assignment for a service request on an uplink control channel and transmitting data in accordance with an automatic repeat request forward error control method for data transmission with an associated acknowledgement scheduled to a resource different from the resource assigned for the service request. Further, as depicted at 342 the methodology provides for receiving a multiplexed transmission on the uplink control channel that can selectively comprise a service request, an ACK/NACK (acknowledgement/not acknowledged), or a service request and an ACK/NACK so that demultiplexing can be achieved for the uplink control channel transmission by mapping.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the Ns independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 4:
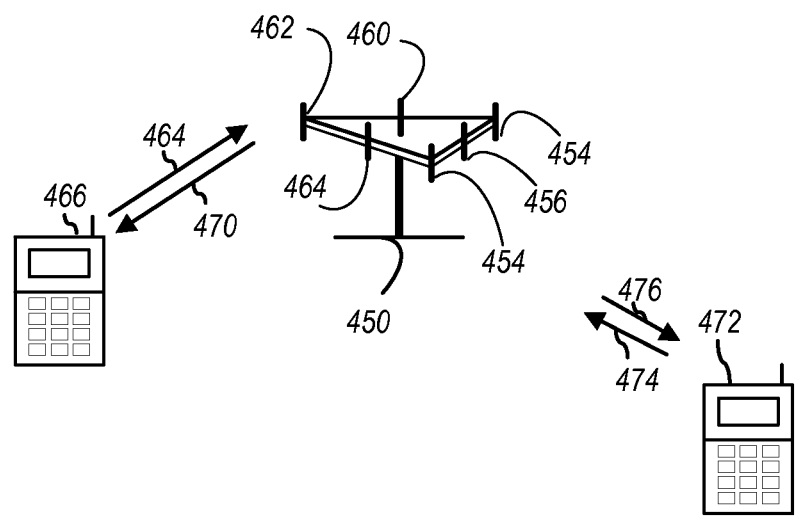
FIG. 4 depicts a block diagram of a multiple access wireless communication system according to one aspect.

Referring to FIG. 4, a multiple access wireless communication system according to one aspect is illustrated. An access point 450 (AP) includes multiple antenna groups, one including 454 and 456, another including 458 and 460, and an additional including 462 and 464. In FIG. 4, only two antennas are shown for each antenna group, however, more or fewer antennas may be utilized for each antenna group. Access terminal (AT) 466 is in communication with antennas 462 and 464, where antennas 462 and 464 transmit information to access terminal 466 over forward link 470 and receive information from access terminal 466 over reverse link 468. Access terminal 472 is in communication with antennas 456 and 458, where antennas 456 and 458 transmit information to access terminal 472 over forward link 476 and receive information from access terminal 472 over reverse link 474. In a FDD system, communication links 468, 470, 474 and 476 may use different frequency for communication. For example, forward link 470 may use a different frequency then that used by reverse link 468. Each group of antennas and/or the area in which they are designed to communicate is often referred to as a sector of the access point 450. In the aspect, antenna groups each are designed to communicate to access terminals 466, 472 in a sector of the areas covered by access point 450.

In communication over forward links 470 and 476, the transmitting antennas of access point 450 utilize beamforming in order to improve the signal-to-noise ratio of forward links for the different access terminals 466 and 474. Also, an access point using beamforming to transmit to access terminals scattered randomly through its coverage causes less interference to access terminals in neighboring cells than an access point transmitting through a single antenna to all its access terminals.

An access point 450 may be a fixed station used for communicating with the terminals and may also be referred to as an access point, a Node B, or some other terminology. An access terminal 466, 472 may also be called user equipment (UE), a wireless communication device, terminal, access terminal or some other terminology.

Figure 5:
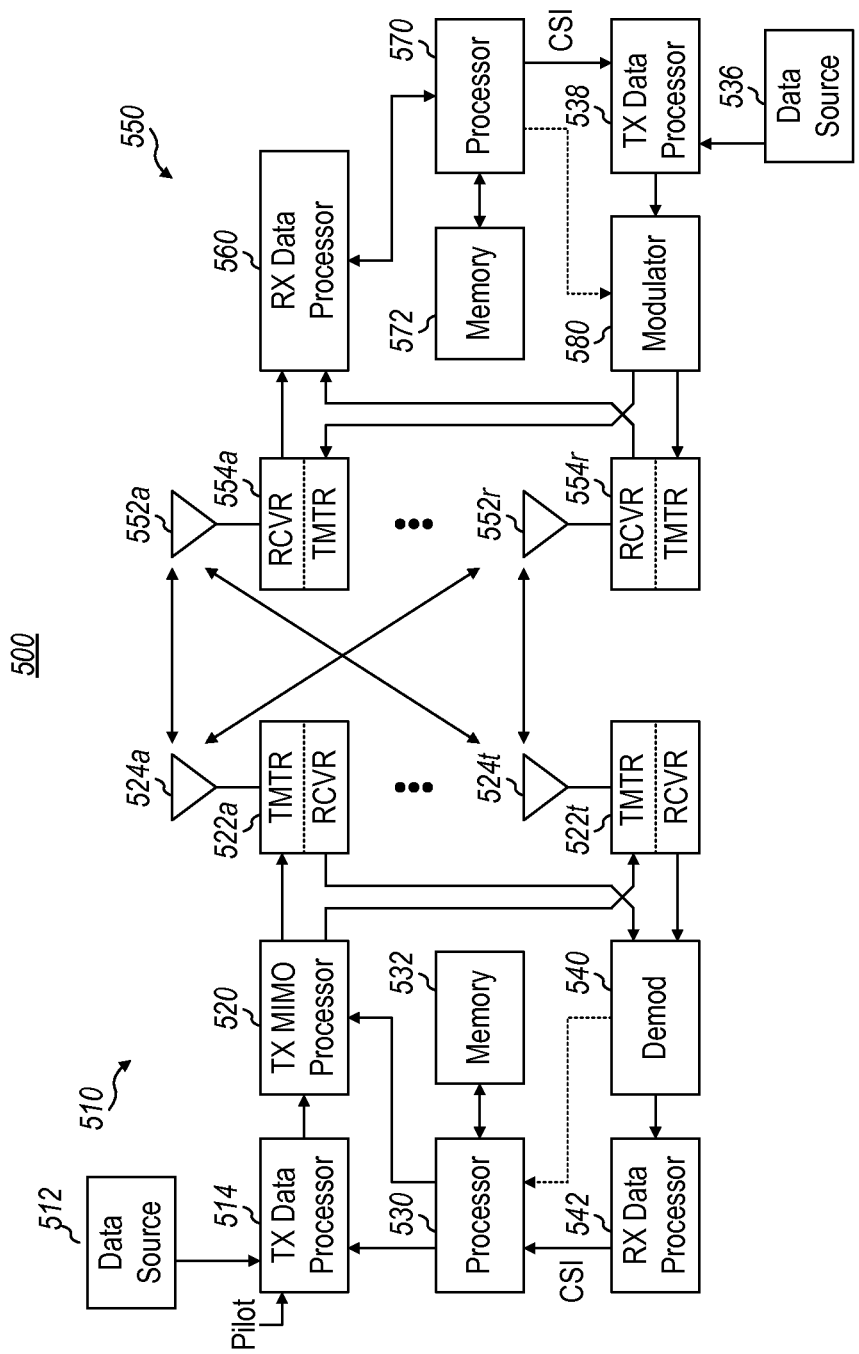
FIG. 5 depicts a block diagram of a communication system according to one aspect.

FIG. 5 is a block diagram of an aspect of a transmitter system 510 (also known as the access point) and a receiver system 550 (also known as access terminal) in a MIMO system 500. At the transmitter system 510, traffic data for a number of data streams is provided from a data source 512 to a transmit (TX) data processor 514.

In an aspect, each data stream is transmitted over a respective transmit antenna. TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 530.

The modulation symbols for all data streams are then provided to a TX MIMO processor 520, which may further process the modulation symbols (e.g., for OFDM). TX MIMO processor 520 then provides $N_T$ modulation symbol streams to $N_T$ transmitters (TMTR) 522a through 522t. In certain implementations, TX MIMO processor 520 applies beamforming weights to the symbols of the data streams and to the antenna from which the symbol is being transmitted.

Each transmitter 522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 522a through 522t are then transmitted from $N_T$ antennas 524a through 524t, respectively.

At receiver system 550, the transmitted modulated signals are received by $N_R$ antennas 552a through 552r and the received signal from each antenna 552 is provided to a respective receiver (RCVR) 554a through 554r. Each receiver 554 conditions (e.g., filters, amplifies, and downconverts) a respective received signal, digitizes the conditioned signal to provide samples, and further processes the samples to provide a corresponding "received" symbol stream.

An RX data processor 560 then receives and processes the $N_R$ received symbol streams from $N_R$ receivers 554 based on a particular receiver processing technique to provide $N_T$ "detected" symbol streams. The RX data processor 560 then demodulates, deinterleaves, and decodes each detected symbol stream to recover the traffic data for the data stream. The processing by RX data processor 560 is complementary to that performed by TX MIMO processor 520 and TX data processor 514 at transmitter system 510.

A processor 570 periodically determines which pre-coding matrix to use (discussed below). Processor 570 formulates a reverse link message comprising a matrix index portion and a rank value portion.

The reverse link message may comprise various types of information regarding the communication link and/or the received data stream. The reverse link message is then processed by a TX data processor 538, which also receives traffic data for a number of data streams from a data source 536, modulated by a modulator 580, conditioned by transmitters 554a through 554r, and transmitted back to transmitter system 510.

At transmitter system 510, the modulated signals from receiver system 550 are received by antennas 524, conditioned by receivers 522, demodulated by a demodulator 540, and processed by a RX data processor 542 to extract the reserve link message transmitted by the receiver system 550. Processor 530 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); Broadband Pilot Channel (BPICH).

In an aspect, a channel structure is provided that preserves low PAR (at any given time, the channel is contiguous or uniformly spaced in frequency) properties of a single carrier waveform.

For the purposes of the present document, the following abbreviations apply:

AIS Automatic Identification System
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CDI Channel Direction Information
CP Cyclic Prefix
CRC Cyclic Redundancy Check
CTCH Common Traffic CHannel
DCCH Dedicated Control CHannel
DCH Dedicated CHannel
DL DownLink
DL-SCH Downlink Shared CHannel
DSCH Downlink Shared CHannel
DTCH Dedicated Traffic CHannel
FACH Forward link Access CHannel
FDD Frequency Division Duplex
i.i.d. independent and identically distributed
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MBSFN Multicast Broadcast Single Frequency Network
MCCH MBMS point-to-multipoint Control Channel
MCE MBMS Coordinating Entity
MCH Multicast CHannel
MIMO Multiple Input Multiple Output
MRW Move Receiving Window
MSB Most Significant Bit
MSCH MBMS point-to-multipoint Scheduling CHannel
MTCH MBMS point-to-multipoint Traffic Channel
PCCH Paging Control CHannel
PCH Paging CHannel
PDCCH Physical Downlink Control Channel
PDSCH Physical Downlink Shared Channel PDU Protocol Data Unit
PHY PHYsical layer
PhyCH Physical CHannels
PUSCH Physical Uplink Shared Channel
PUCCH Physical Uplink Control Channel
QoS Quality of Service
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMB Ultra Mobile Broadband
UMD Unacknowledged Mode Data
UMTS Universal Mobile Telecommunications System
UTRA UMTS Terrestrial Radio Access
UTRAN UMTS Terrestrial Radio Access Network
WWAN Wireless Wide Area Network ACKnowledge/Negative ACKnowledge (ACK/NACK) transmissions transmitted by a receiver (e.g., UE) communicate the success or failure of reception of data transmitted by a transmitter (e.g., e-NB). In one aspect, the resource assigned for ACK/NACK transmission by a receiver is known a priori, e.g., by way of explicit mapping to a corresponding physical downlink control channel (PDCCH) assignment for the physical downlink shared channel (PDSCH) transmission.

Service Request (SR) transmissions transmitted by a UE communicate a request to the e-NB for resources for transmission. In one aspect, resources (e.g., frequency and time assignment) allocated for transmission of SR by UE are signaled via layer 3 (L3) signaling, and thus, will be known a priori.

Figure 6:
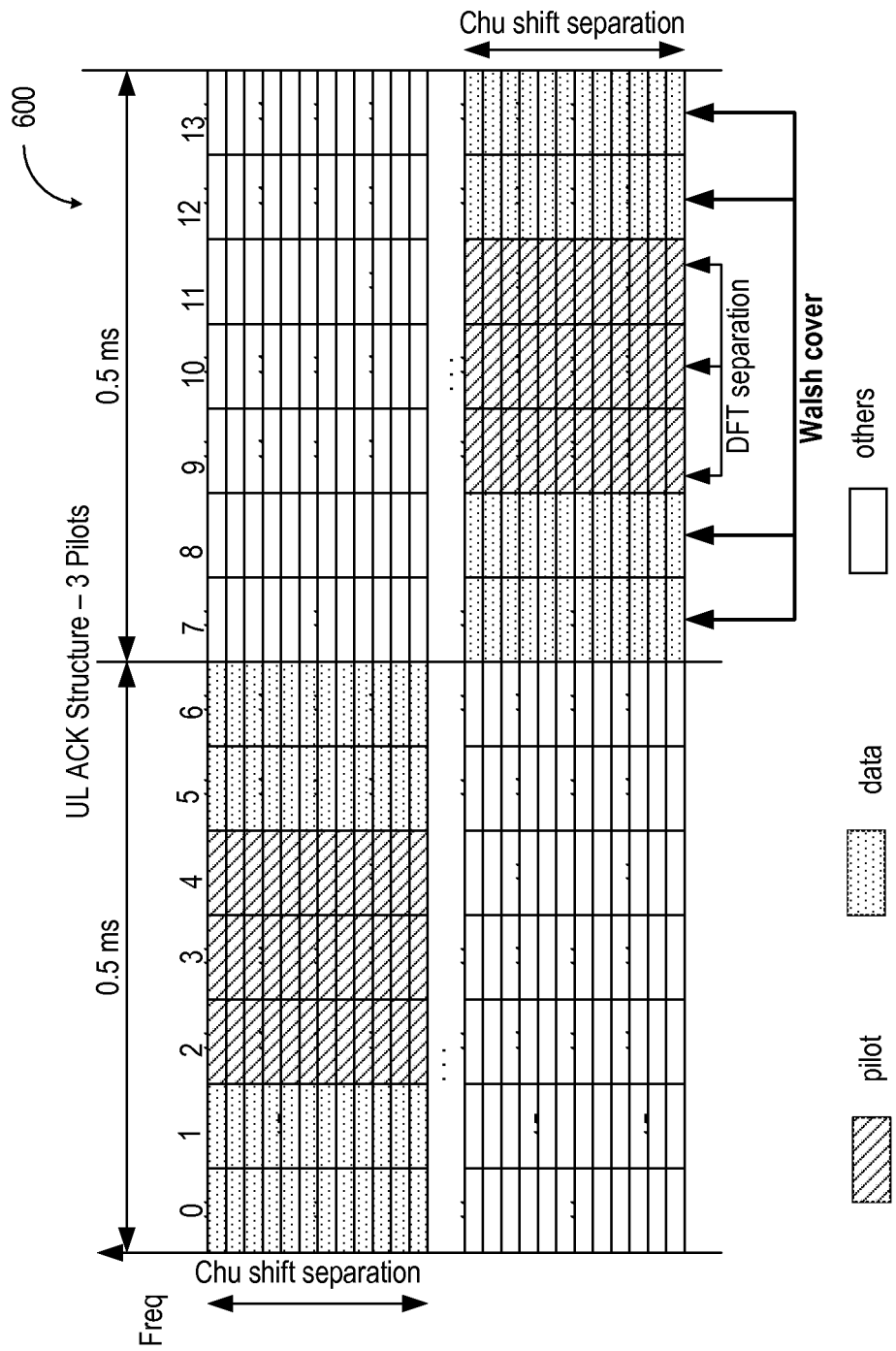
FIG. 6 depicts a block diagram depicting an exemplary uplink ACK/NACK channel structure according to one aspect.

The physical uplink control channel (PUCCH) carries uplink control information, including ACK/NACK transmissions and SR transmissions, and may support multiple formats. In an aspect, for the uplink (UL) ACK/NACK channel as well as SR channel transmissions, cyclically shifted Constant Amplitude Zero Auto-Correlation (CAZAC) sequences as well as DFT and Walsh spreading are used to multiplex different users. By way of example, for the UL ACK/NACK channel transmission, both reference signal (RS), and data may use cyclically shifted CAZAC sequences of length 12. In an aspect, up to 18 users can be multiplexed based on the cyclic shifts of CAZAC sequences as well as time domain spreading of DFT for RS and Walsh for data. FIG. 6 illustrates an exemplary UL ACK/NACK channel structure 600 with 3 pilots.

In situations where both ACK/NACK transmissions and SR transmissions are to be simultaneously transmitted and, therefore, multiplexed by the UE, one or more of the following problems may be presented: increased processing complexity, reduced link efficiency, and/or increased requirement for multiplexing capabilities. For example, if different shifts and time domain spreading codes were specified for ACK/NACK transmission as opposed to transmission involving both SR and ACK/NACK transmission, some resources would be required to be set aside for the SR transmission. Drawbacks associated with this approach include some loss in multiplexing capability of the ACK channels and restriction of the maximum ACK channels to 12 instead of 18. Moreover, blind decoding would be required to differentiate ACK vs. SR+ACK transmissions. On the other hand, if higher order modulation, such as 8-PSK, were implemented to multiplex ACK/NACK and SR transmission, a significant link level loss compared to QPSK would result. This link loss can be a particularly limiting factor for users at the edge of coverage.

Figure 7:
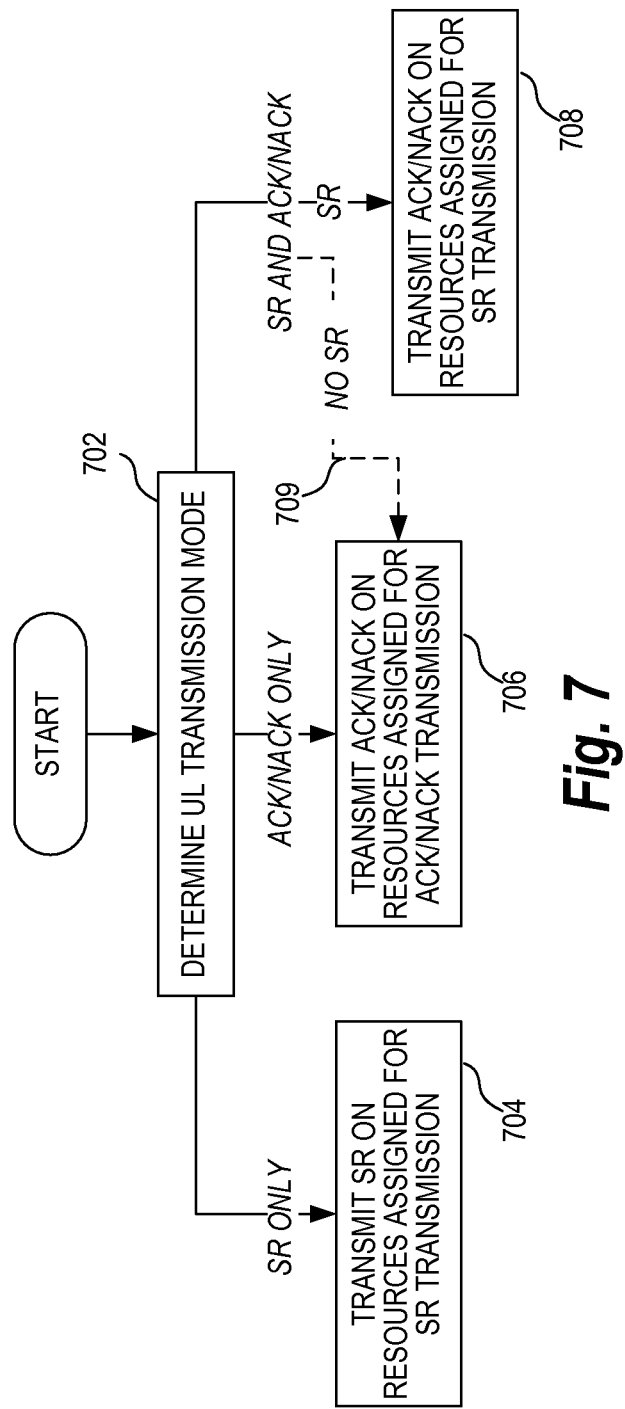
FIG. 7 depicts a flow chart illustrating an enhanced multiplexing method for uplink control channels according to one aspect.

Referring to FIG. 7, a flow chart illustrating an enhanced multiplexing method for uplink control channels according to one aspect is shown. At block 702, the UE determines the uplink transmission mode of the UE. As discussed above, the transmission resources for SR may be known a priori via upper layer signaling, e.g., L3 signaling. Additionally, the resource assigned for ACK/NACK transmission by a receiver is known a priori, e.g., by way of explicit mapping to a corresponding physical downlink control channel (PDCCH) assignment for the physical downlink shared channel (PDSCH) transmission. Accordingly, from the above information, the UE is able to determine a particular uplink transmission mode, that is, if it scheduled to send only SR transmissions (first uplink transmission mode), or if it is scheduled to send only ACK/NACK transmissions (second uplink transmission mode), or if it is scheduled to send both SR transmissions and ACK/NACK transmissions (third uplink transmission mode).

In a first uplink transmission mode, only SR transmissions are sent (i.e., without ACK/NACK transmission), and at block 704 the UE transmits SR information on the resources assigned for SR transmission. In a second uplink transmission mode, only ACK/NACK transmission are sent (i.e., without SR transmission), and at block 706, the UE transmits ACK/NACK information on the resources assigned for ACK/NACK transmission.

In a third uplink transmission mode, the UE is scheduled to send both SR and ACK/NACK transmissions. In the case where the UE has a SR to transmit, at block 708, the UE transmits ACK/NACK information on the resources assigned for SR transmission. The transmission of the ACK/NACK information on the SR resources communicates both the ACK/NACK information and the indication of a service request.

In the case where the UE is scheduled to send both SR and ACK/NACK transmission, but the UE does not have a SR request to transmit, the UE transmits the ACK/NACK transmission over the ACK/NACK resource (this corresponds to the actions of block 706) as indicated by optional path 709. As such the selection (or non-selection) of the transmission resources of the SR for communicating the ACK/NACK additionally signals the SR bit. Consequently, the multiplexing capability of the ACK/NACK channel is not reduced.

Figure 8:
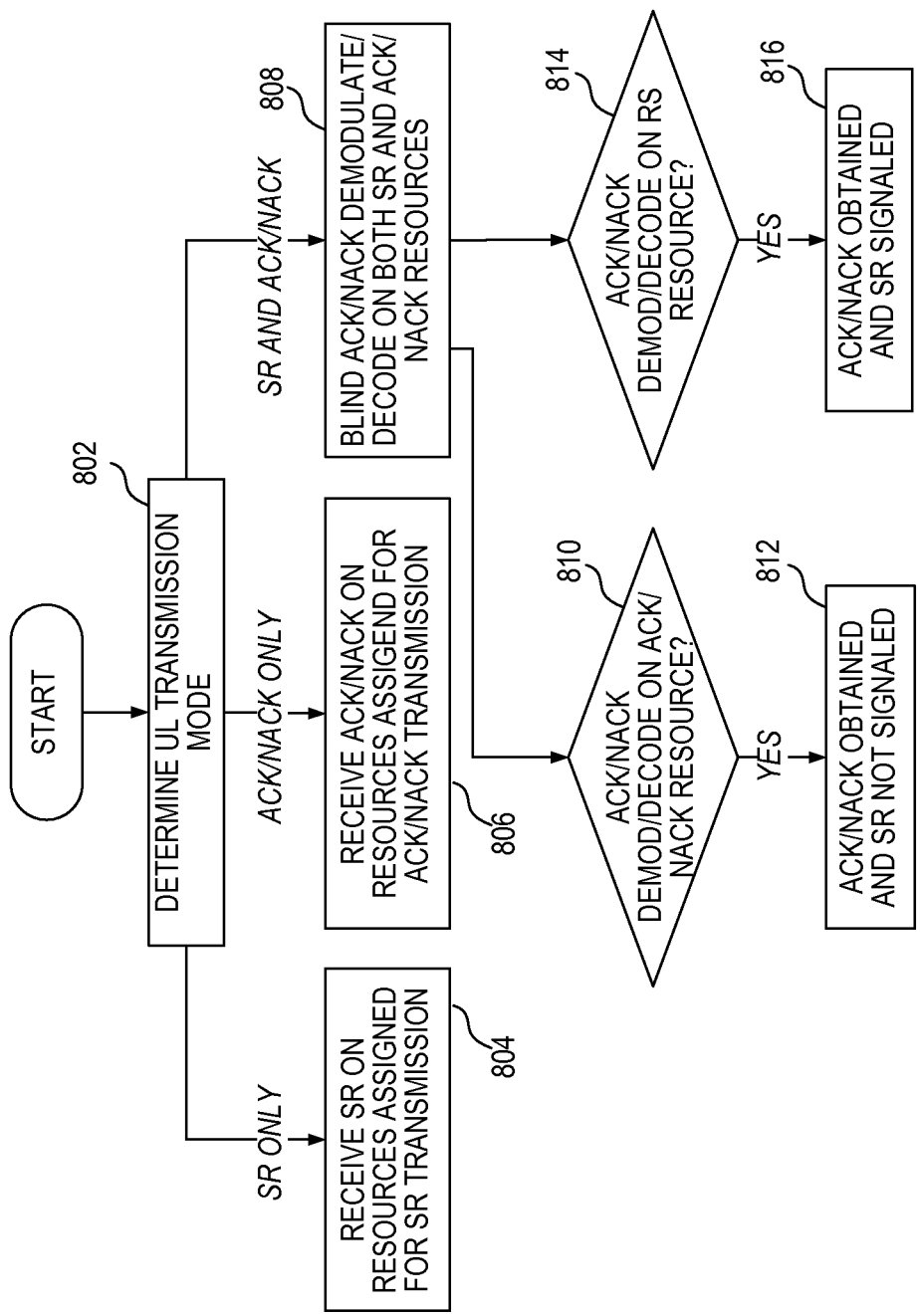
FIG. 8 depicts a flow chart illustrating a methodology for reception of the enhanced multiplexing technique of FIG. 7 according to one aspect.

Referring to FIG. 8, a flow chart illustrating a method for reception of the enhanced multiplexing technique of FIG. 7 according to one aspect is shown. At block 802, the e-NB determines the transmission uplink mode of the UE. As discussed above, the transmission resources for SR may be known a priori via upper layer signaling, e.g., L3 signaling. Additionally, the resource assigned for ACK/NACK transmission by a receiver is known a priori, e.g., by way of explicit mapping to a corresponding physical downlink control channel (PDCCH) assignment for the physical downlink shared channel (PDSCH) transmission. Accordingly, from the above information, the e-NB is able to determine the uplink transmission mode of the UE, that is, if the UE is scheduled to send only SR transmissions (first uplink transmission mode), or if the UE is scheduled to send only ACK/NACK transmissions (second uplink transmission mode), or if the UE is scheduled to send both SR transmissions and ACK/NACK transmissions (third uplink transmission mode).

In a first uplink transmission mode, only SR transmissions are sent (i.e., without ACK/NACK transmission), and at block 804 the e-NB receives and processes (demodulate, decode, etc.) SR information on the resources assigned for SR transmission (i.e., the SR transmission from the UE at block 404 of FIG. 7). In a second uplink transmission mode, only ACK/NACK transmission are sent (i.e., without SR transmission), and at block 806, the e-NB receives and processes ACK/NACK information on the resources assigned for ACK/NACK transmission (i.e., the ACK/NACK transmission from the UE at block 406 of FIG. 4).

In a third uplink transmission mode, the UE is scheduled to send both SR and ACK/NACK transmissions, and at block 808, the e-NB performs blind ACK/NACK demodulation and decoding on resources assigned for both ACK/NACK and SR transmissions. Following block 808, at block 810, the e-NB determines if ACK/NACK was correctly demodulated and decoded on the ACK/NACK recourses, and, if so, the ACK/NACK information is obtained and furthermore the e-NB determines that a SR was not requested by the UE. As described above, in FIG. 7, the communication of the ACK/NACK information over the ACK/NACK resources (block 706) is associated with the UE's communication of ACK/NACK information only (i.e., without SR).

Also following block 808, at block 814, the e-NB determines if ACK/NACK was correctly demodulated and decoded on the SR recourses, and, if so, the ACK/NACK information is obtained and furthermore the e-NB determines that a SR was requested by the UE. As described above, in FIG. 7, the communication of the ACK/NACK information over the SR resources (block 708) is associated with the UE's communication of ACK/NACK information and further the signaling of a SR.

Figure 9:
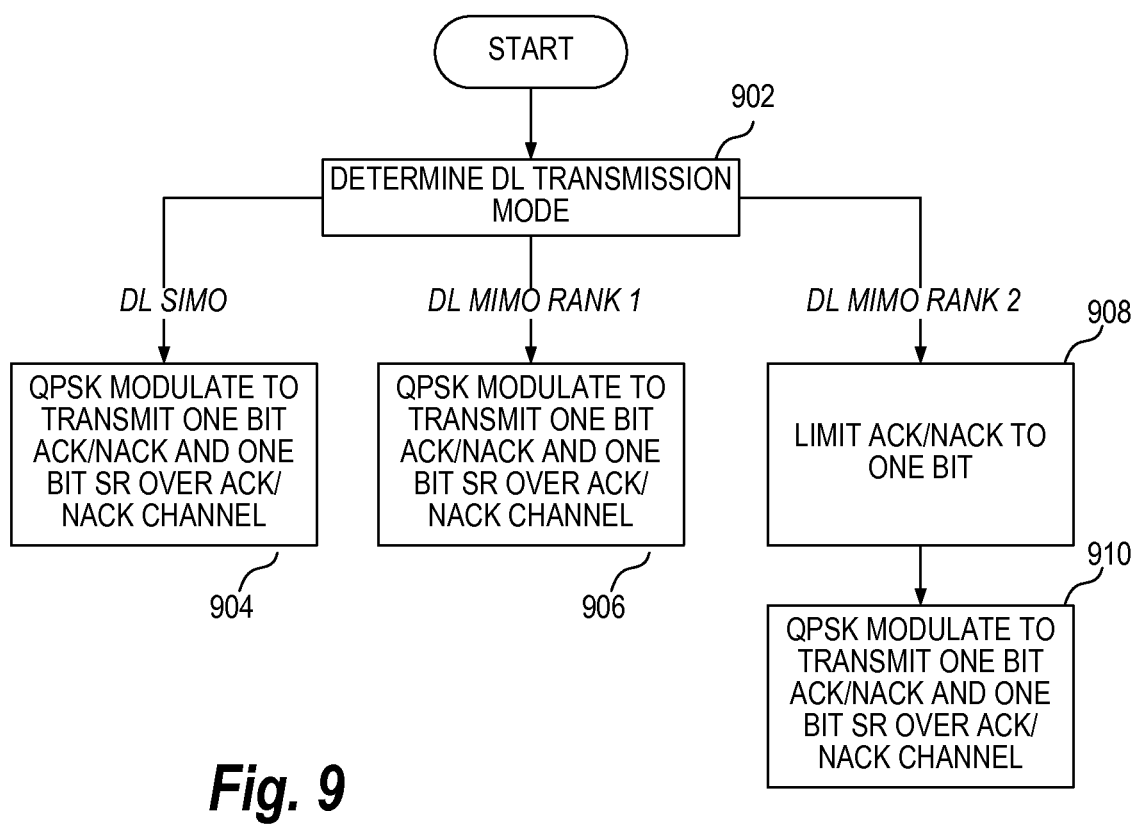
FIG. 9 depicts a flow diagram illustrating a methodology for processing enhanced uplink control channels according to one aspect.

Referring to FIG. 9, a flow chart illustrating an enhanced multiplexing method for uplink control channels according to another aspect is shown. At block 902, the UE determines the downlink (DL) transmission mode. In the example of FIG. 9, cases for DL single-input multiple-output (SIMO), DL MIMO with rank 1, and DL MIMO with rank 2 are shown. In both DL SIMO and DL MIMO with rank 1, a single downlink layer or stream is transmitted, and one bit of ACK/NACK and one bit of SR may be communicated. In DL MIMIO with rank 2, two or more downlink layers or streams are transmitted, and two bits of ACK/NACK are typically sent, each bit corresponding to a particular layer or stream; additionally, one bit of SR may be sent.

In a first DL transmission mode associated with DL SIMO, at block 904, the UE transmits one bit of ACK/NACK and one bit of SR employing QPSK modulation over the ACK/NACK channel. In a second DL transmission mode associated with DL MIMO rank 1, at block 906, the UE transmits one bit of ACK/NACK and one bit of SR employing QPSK modulation over the ACK/NACK channel.

In a third DL transmission mode associated with DL MIMO rank 2, at block 908, the ACK/NACK information is limited to one bit, and one bit may be used to communicate SR employing QPSK modulation over the ACK/NACK channel at block 910. By way of illustration, the ACK/NACK bit can be set to true or "ACK" if both layers or streams of the DL MIMO rank 2 transmission are correctly received; otherwise a false or "NACK" is sent.

The e-NB is configured to process each of the communications transmitted by the UE associated with blocks 904, 906 and 910.

Figure 10:
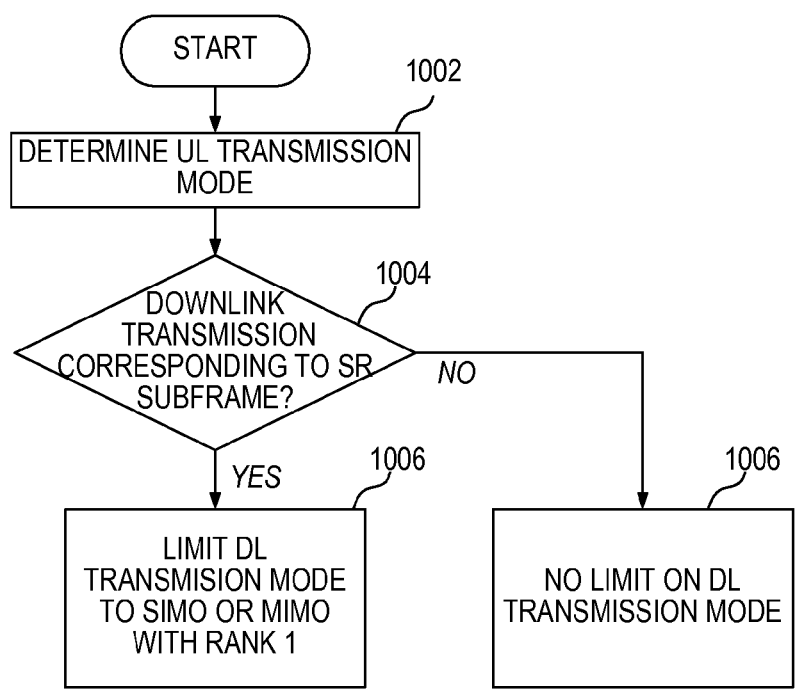
FIG. 10 depicts a flow chart illustrating an enhanced multiplexing methodology for uplink control channels according to one aspect.

Referring to FIG. 10, a flow chart illustrating an enhanced multiplexing method for uplink control channels according to another aspect is shown. At block 1002, the uplink transmission mode of the UE is determined. As discussed above, the transmission resources for SR may be known a priori via upper layer signaling, e.g., L3 signaling. Additionally, the resource assigned for ACK/NACK transmission by a receiver is known a priori, e.g., by way of explicit mapping to a corresponding physical downlink control channel (PDCCH) assignment for the physical downlink shared channel (PDSCH) transmission. Accordingly, from the above information, it can be determined if the UE scheduled to send only SR transmissions, or if it is scheduled to send only ACK/NACK transmissions, or if it is scheduled to send both SR transmissions and ACK/NACK transmissions.

At block 1004, a determination is made if a downlink transmission corresponds to a SR subframe, in which case the UE would be scheduled to send both SR transmissions and ACK/NACK transmissions. If so, the flow chart continues to block 1006, where a scheduler limits the DL transmission mode to the UE. For example, the DL transmission mode may be limited to a single layer or single stream transmission mode, such as SIMO or MIMO with Rank 1. As such, only one bit for ACK is required, and one bit may be used to transmit a SR. Accordingly, the UE transmits one bit of ACK/NACK and one bit of SR employing QPSK modulation over the ACK/NACK channel. If at block 1004, the UE is not scheduled to send both SR transmissions and ACK/NACK transmissions, the DL transmission mode is not limited, and MIMO Rank 2 transmission may be enabled. In such case, an SR bit is not required, and two bits can be used employing QPSK modulation over the ACK/NACK channel, one bit for each layer or stream associated with the MIMO Rank 2 transmission. Link level performance is thereby improved.

Figure 11:
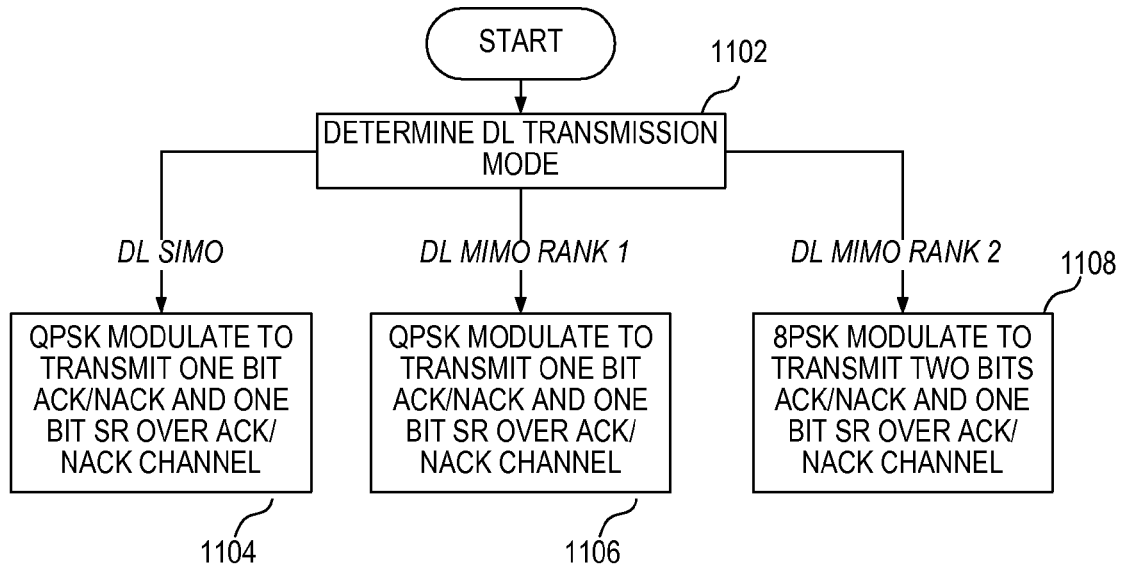
FIG. 11 depicts a flow chart illustrating an enhanced multiplexing methodology for uplink control channels according to one aspect.

Referring to FIG. 11, a flow chart illustrating an enhanced multiplexing method for uplink control channels according to another aspect is shown. At block 1102, the UE determines the downlink (DL) transmission mode. In the example of FIG. 11, cases for DL single-input multiple-output (SIMO), DL MIMO with rank 1, and DL MIMO with rank 2 are shown. In both DL SIMO and DL MIMO with rank 1, one bit of ACK/NACK and one bit of SR may be communicated. IN DL MIMIO with rank 2, two bits of ACK/NACK are typically sent, each bit corresponding to a particular layer; additionally, one bit of SR may be sent.

In a first DL transmission mode associated with DL SIMO, at block 1104, the UE transmits one bit of ACK/NACK and one bit of SR employing QPSK modulation over the ACK/NACK channel. In a second DL transmission mode associated with DL MIMO rank 1, at block 1106, the UE transmits one bit of ACK/NACK and one bit of SR employing QPSK modulation over the ACK/NACK channel.

In a third DL transmission mode associated with DL MIMO rank 2, at block 1108, the UE transmits two bits of ACK/NACK and one bit of SR employing 8PSK modulation over the ACK/NACK channel. Since MIMO users with rank 2 are typically interior users, the link level difference between 8PSK and QPSK will generally not be a limiting factor for such users.

By the virtue of the foregoing, it should be appreciated that various aspects have been disclosed, with the following comprising an illustrative but not all-inclusive listing:

In one aspect, a method is provided for multiplexing uplink control channels comprising determining an uplink transmission mode of a UE and transmitting ACK/NACK information on a non-ACK/NACK resource based on the determined uplink transmission mode of the UE. In another aspect, the ACK/NACK information can be transmitted on a service request resource when the UE is scheduled to transmit a service request and an ACK/NACK at the same time. In an additional aspect, the presence of the ACK/NACK information on the service request resource further indicates a service request.

Alternatively, the method can further comprise transmitting a service request on a service request resource when the UE is scheduled to transmit the service request but not scheduled to transmit an ACK/NACK.

As another alternatively, the method can further comprise transmitting ACK/NACK on an ACK/NACK resource when the UE is not scheduled to transmit a service request but is scheduled to transmit the ACK/NACK.

As an additional alternative, the method can further comprise transmitting ACK/NACK on an ACK/NACK resource when the UE is scheduled to transmit a service request and an ACK/NACK at the same time, wherein the presence of the ACK/NACK information on the ACK/NACK resource further indicates an absence of a service request.

In a further aspect, a method has been provided for receiving uplink control channels by determining an uplink transmission mode of a UE, blind processing an ACK/NACK resource in conjunction with a non-ACK/NACK resource to obtain ACK/NACK transmission from the UE, and determining a signaling of a second channel if the ACK/NACK transmission was successfully processed from the non-ACK/NACK resource. In another additional aspect, the non-ACK/NACK resource is a service request resource and wherein the signaling of the second channel comprising signaling of a service request. Alternatively, the method can further comprise determining a lack of signaling of the second channel if the ACK/NACK transmission was successfully processed from the ACK/NACK resource. In particular, the non-ACK/NACK resource can be a service request resource, wherein the determining a lack of signaling of the second channel comprising determining that a service request was not sent.

In yet another aspect, a method has been provided for multiplexing uplink control channels by limiting ACK/NACK feedback information to a single bit for a plurality of downlink transmission streams, QPSK modulating the single bit of ACK/NACK information and a second bit of service request information over an ACK/NACK channel.

In yet an additional aspect, a method has been provided for scheduling a transmission mode of a UE by determining an uplink transmission mode of a UE, limiting a downlink transmission mode of UE to single stream based on the determined uplink transmission mode of the UE. In another aspect, the UE can be limited to DL SIMO or DL MIMO with Rank 1 when the UE is scheduled to transmit a service request and an ACK/NACK at the same time.

In one more aspect, a method has been provided for multiplexing uplink control channels by determining a downlink transmission mode of a UE, QPSK modulating a single bit of ACK/NACK information and a second bit of service request information over an ACK/NACK channel for a single stream downlink transmission mode of the UE, and 8PSK modulating a plurality of bits of ACK/NACK information and the second bit of service request information over the ACK/NACK channel for a multiple stream downlink transmission mode of the UE.

In an additional aspect, an apparatus has been provided that is operable in wireless communication system. Means have been provided for determining an uplink transmission mode of a UE. Means have been provided for transmitting ACK/NACK information on a non-ACK/NACK resource based on the determined uplink transmission mode of the UE.

In yet a further aspect, an apparatus has been provided that is operable in wireless communication system. Means have been provided for determining an uplink transmission mode of a UE. Means have been provided for blind processing an ACK/NACK resource in conjunction with a non-ACK/NACK resource to obtain ACK/NACK transmission from the UE. Means have been provided for determining a signaling of a second channel if the ACK/NACK transmission was successfully processed from the non-ACK/NACK resource.

In yet another aspect, an apparatus has been provided that is operable in wireless communication system. Means have been provided for limiting ACK/NACK feedback information to a single bit for a plurality of downlink transmission streams. Means have been provided for QPSK modulating the single bit of ACK/NACK information and a second bit of service request information over an ACK/NACK channel.

In another aspect, an apparatus has been provided that is operable in wireless communication system. Means have been provided for determining an uplink transmission mode of a UE. Means have been provided for limiting a downlink transmission mode of UE to single stream based on the determined uplink transmission mode of the UE.

In an additional aspect, an apparatus has been provided that is operable in wireless communication system. Means have been provided for determining a downlink transmission mode of a UE. Means have been provided for QPSK modulating a single bit of ACK/NACK information and a second bit of service request information over an ACK/NACK channel for a single stream downlink transmission mode of the UE. Means have been provided for 8PSK modulating a plurality of bits of ACK/NACK information and the second bit of service request information over the ACK/NACK channel for a multiple stream downlink transmission mode of the UE.

In another additional aspect, an electronic device has been provided that is configured to execute any of the afore-mentioned methods.

In one aspect, a machine-readable medium has been provided that comprises instructions which, when executed by a machine, cause the machine to perform operations including determining an uplink transmission mode of a UE, and transmitting ACK/NACK information on a non-ACK/NACK resource based on the determined uplink transmission mode of the UE.

In another aspect, a machine-readable medium has been provided that comprises instructions which, when executed by a machine, cause the machine to perform operations including determining an uplink transmission mode of a UE, blind processing an ACK/NACK resource in conjunction with a non-ACK/NACK resource to obtain ACK/NACK transmission from the UE, and determining a signaling of a second channel if the ACK/NACK transmission was successfully processed from the non-ACK/NACK resource.

In a further aspect, a machine-readable medium has been provided that comprises instructions which, when executed by a machine, cause the machine to perform operations including limiting ACK/NACK feedback information to a single bit for a plurality of downlink transmission streams, and QPSK modulating the single bit of ACK/NACK information and a second bit of service request information over an ACK/NACK channel.

In an additional aspect, a machine-readable medium has been provided that comprises instructions which, when executed by a machine, cause the machine to perform operations including determining an uplink transmission mode of a UE, and limiting a downlink transmission mode of UE to single stream based on the determined uplink transmission mode of the UE.

In yet another aspect, a machine-readable medium has been provided that comprises instructions which, when executed by a machine, cause the machine to perform operations including determining a downlink transmission mode of a UE, QPSK modulating a single bit of ACK/NACK information and a second bit of service request information over an ACK/NACK channel for a single stream downlink transmission mode of the UE, and 8PSK modulating a plurality of bits of ACK/NACK information and the second bit of service request information over the ACK/NACK channel for a multiple stream downlink transmission mode of the UE.

In yet another additional aspect, an apparatus has been provided that is operable in a wireless communication system. A processor is configured for determining an uplink transmission mode of a UE, and transmitting ACK/NACK information on a non-ACK/NACK resource based on the determined uplink transmission mode of the UE. A memory is coupled to the processor for storing data.

In one further aspect, an apparatus has been provided that is operable in a wireless communication system. A processor is configured for determining an uplink transmission mode of a UE; blind processing an ACK/NACK resource in conjunction with a non-ACK/NACK resource to obtain ACK/NACK transmission from the UE; and determining a signaling of a second channel if the ACK/NACK transmission was successfully processed from the non-ACK/NACK resource. A memory is coupled to the processor for storing data.

In another one aspect, an apparatus has been provided that is operable in a wireless communication system. A processor is configured for limiting ACK/NACK feedback information to a single bit for a plurality of downlink transmission streams, and QPSK modulating the single bit of ACK/NACK information and a second bit of service request information over an ACK/NACK channel. A memory is coupled to the processor for storing data.

In one aspect, an apparatus has been provided that is operable in a wireless communication system. A processor is configured for determining an uplink transmission mode of a UE, and limiting a downlink transmission mode of UE to single stream based on the determined uplink transmission mode of the UE. A memory is coupled to the processor for storing data.

In another aspect, an apparatus has been provided that is operable in a wireless communication system. A processor is configured for determining a downlink transmission mode of a UE; QPSK modulating a single bit of ACK/NACK information and a second bit of service request information over an ACK/NACK channel for a single stream downlink transmission mode of the UE; and 8PSK modulating a plurality of bits of ACK/NACK information and the second bit of service request information over the ACK/NACK channel for a multiple stream downlink transmission mode of the UE. A memory is coupled to the processor for storing data.

In yet another additional aspect, a method has been provided for multiplexing uplink control channels by determining an uplink transmission mode of a UE, and transmitting uplink control channel information on a resource not associated with the uplink control channel information based on the determined uplink transmission mode of the UE.

Figure 12:
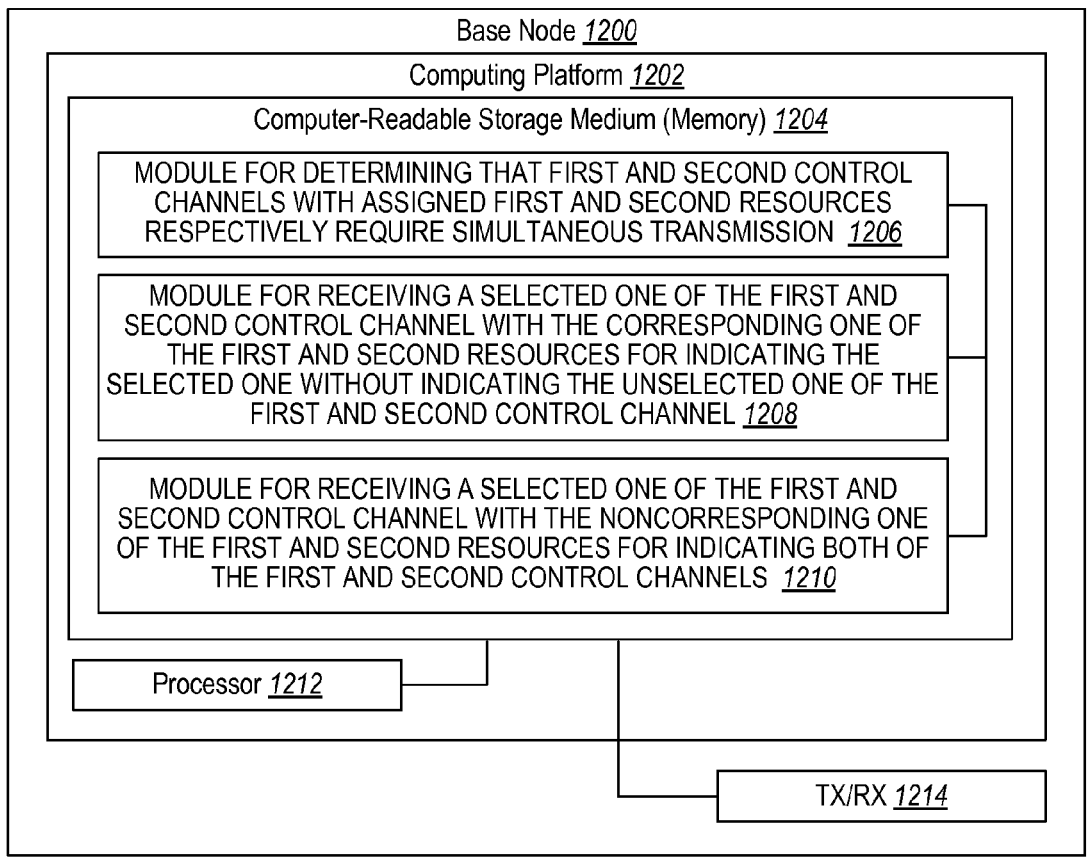
FIG. 12 depicts a block diagram of user equipment (UE) for transmitting multiplexed service request and data acknowledgement on uplink control channel.
Figure 13:
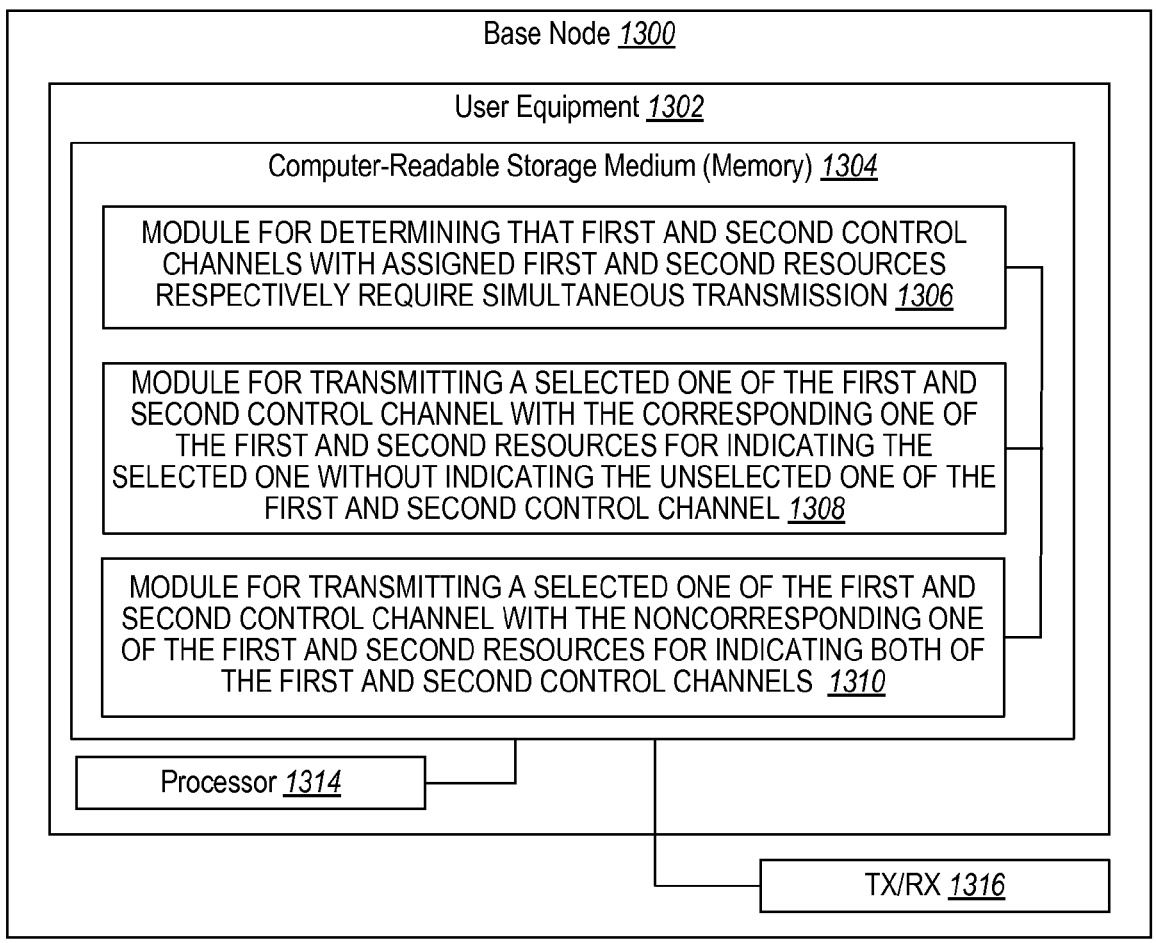
FIG. 13 depicts a block diagram of base node for receiving multiplexed service request and data acknowledgement on uplink control channel.

In FIG. 12, base node 1200 has a computing platform 1202 that provides module such as sets of codes for causing a computer to receive multiplexed uplink control channels. In particular, the computing platform 1202 includes a computer readable storage medium (e.g., memory) 1204 that stores a plurality of modules (e.g., electronic component or logic circuit) 1206-1210 executed by a processor(s) 1212, which also controls a transmitter/receiver component 1214 for communicating with eNBs (FIG. 13). In particular, module 1206 is provided for determining that first and second control channels with assigned first and second resources respectively require simultaneous transmission. Module 1208 is provided for receiving a selected one of the first and second control channel with the corresponding one of the first and second resources for indicating the selected one without indicating the unselected one of the first and second control channel. Module (module) 1210 is provided for receiving a selected one of the first and second control channel with the noncorresponding one of the first and second resources for indicating both of the first and second control channels.

In FIG. 13, user equipment (UE) 1300 has a computing platform 1302 that provides module such as sets of codes for causing a computer to transmit multiplexed uplink control channels. In particular, the computing platform 1302 includes a computer readable storage medium (e.g., memory) 1304 that stores a plurality of modules (e.g., electronic component or logic circuit) 1306-1310 executed by a processor(s) 1314, which also controls a transmitter/receiver component 1316 for communicating with eNB (FIG. 12). In particular, module 1306 is provided for determining that first and second control channels with assigned first and second resources respectively require simultaneous transmission. Module 1308 is provided for transmitting a selected one of the first and second control channel with the corresponding one of the first and second resources for indicating the selected one without indicating the unselected one of the first and second control channel. Module 1310 is provided for transmitting a selected one of the first and second control channel with the noncorresponding one of the first and second resources for indicating both of the first and second control channels.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, means, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logical blocks, modules, means, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for multiplexing control information, comprising:
    determining there is a conflict between resources assigned for a first uplink control channel for transmitting a service request and resources assigned for a second uplink control channel for transmitting a data acknowledgement;
    determining a downlink (DL) transmission mode is multiple input multiple output (MIMO) with rank two (2) transmission; and
    in response to the determinations, multiplexing the data acknowledgement and the service request by implementing a feedback restriction, the feedback restriction requiring that an acknowledgment transmission be used to acknowledge successful receipt of two downlink streams.

2. The method of claim 1, further comprising modulating the multiplexed data acknowledgment and service request by quadrature phase-shift keying (QPSK).

3. A method for multiplexing control information, comprising:
    determining there is a conflict between resources assigned for a first uplink control channel for transmitting a service request and resources assigned for a second uplink control channel for transmitting a data acknowledgement;
    receiving a scheduling restriction, the scheduling restriction requiring selection of single input multiple output (SIMO) when downlink transmission corresponds to a service request subframe; and
    multiplexing the data acknowledgement and the service request on the second uplink control channel using quadrature phase-shift (QPSK) modulation.

4. A method for multiplexing control information, comprising:
    determining there is a conflict between resources assigned for a first uplink control channel for transmitting a service request and resources assigned for a second uplink control channel for transmitting a data acknowledgement;
    receiving a scheduling restriction, the scheduling restriction requiring selection of multiple input multiple output (MIMO) rank one (1) when downlink transmission corresponds to a service request subframe; and
    multiplexing the data acknowledgement and the service request on the second uplink control channel using quadrature phase-shift (QPSK) modulation.

5. An apparatus for transmitting multiplexed uplink control information, comprising:
    a computing platform for:
        determining there is a conflict between resources assigned for a first uplink control channel for transmitting a service request and resources assigned for a second uplink control channel for transmitting a data acknowledgement; and
        determining a downlink (DL) transmission mode is multiple input multiple output (MIMO) with rank two (2) transmission;
    a multiplexer for multiplexing the data acknowledgement and the service request by implementing a feedback restriction, the feedback restriction requiring that an acknowledgment transmission be used to acknowledge successful receipt of two downlink streams; and
    a transmitter for transmitting the acknowledgment transmission.

6. An apparatus for multiplexing uplink control information, comprising:

a computing platform for determining there is a conflict between resources assigned for a first uplink control channel for transmitting a service request and resources assigned for a second uplink control channel for transmitting a data acknowledgement;

a receiver for receiving a scheduling restriction, the scheduling restriction requiring selection of single input multiple output (SIMO) when downlink transmission corresponds to a service request subframe; and a transmitter for transmitting the data acknowledgement and service request by multiplexing the data acknowledgement and the service request on the second uplink control channel using quadrature phase-shift (QPSK) modulation.

7. An apparatus for multiplexing control information, comprising:

a computing platform for determining there is a conflict between resources assigned for a first uplink control channel for transmitting a service request and resources assigned for a second uplink control channel for transmitting a data acknowledgement;

a receiver for receiving a scheduling restriction, the scheduling restriction requiring selection of multiple input multiple output (MIMO) rank one (1) when downlink transmission corresponds to a service request subframe; and a transmitter for transmitting the data acknowledgement and service request by multiplexing the data acknowledgement and the service request on the second uplink control channel using quadrature phase-shift (QPSK) modulation.

8. A method for de-multiplexing control information, comprising:

determining there is a conflict between resources assigned to a user equipment (UE) for a first uplink control channel for transmitting a service request and resources assigned to the UE for a second uplink control channel for transmitting a data acknowledgement;

determining a downlink (DL) transmission mode is multiple input multiple output (MIMO) with rank two (2) transmission; and in response to the determinations, de-multiplexing the data acknowledgement multiplexed with the service request, wherein the data acknowledgment and the service request are multiplexed by implementing a UE feedback restriction, the feedback restriction requiring that a data acknowledgment be used to acknowledge successful receipt of two downlink streams.

9. The method of claim 8, further comprising demodulating the data acknowledgment multiplexed with the service request, wherein the data acknowledgment multiplexed with the service request is modulated by quadrature phase-shift keying (QPSK).

10. A method for de-multiplexing control information, comprising:

determining there is a conflict between resources assigned to a user equipment (UE) for a first uplink control channel for transmitting a service request and resources assigned to the UE for a second uplink control channel for transmitting a data acknowledgement;

transmitting a scheduling restriction to the UE, the scheduling restriction requiring selection of single input multiple output (SIMO) when downlink transmission corresponds to a service request subframe; and de-multiplexing the data acknowledgement and the service request by demodulating the second uplink control channel transmitted from the UE using quadrature phase-shift (QPSK) modulation.

11. A method for de-multiplexing control information, comprising:

determining there is a conflict between resources assigned to a user equipment (UE) for a first uplink control channel for transmitting a service request and resources assigned to the UE for a second uplink control channel for transmitting a data acknowledgement;

transmitting a scheduling restriction to the UE, the scheduling restriction requiring selection of multiple input multiple output (MIMO) rank one (1) when downlink transmission corresponds to a service request subframe; and de-multiplexing the data acknowledgement and the service request by demodulating the second uplink control channel transmitted from the UE by quadrature phase-shift (QPSK) modulation.

12. An apparatus for de-multiplexing uplink control information, comprising:

a computing platform for:

determining there is a conflict between resources assigned to a user equipment (UE) for a first uplink control channel for transmitting a service request and resources assigned to the UE for a second uplink control channel for transmitting a data acknowledgement; and determining a downlink (DL) transmission mode is multiple input multiple output (MIMO) with rank two (2) transmission; and a de-multiplexer for de-multiplexing the data acknowledgement multiplexed with the service request, wherein the data acknowledgment and service request are multiplexed by implementing a UE feedback restriction, the feedback restriction requiring that an acknowledgment be used to acknowledge successful receipt of two downlink streams.

13. The apparatus of claim 12, further comprising a demodulator for demodulating the data acknowledgment multiplexed with the service request, wherein the data acknowledgment and service request are modulated by quadrature phase-shift keying (QPSK).

14. An apparatus for de-multiplexing uplink control information, comprising:

a computing platform for determining there is a conflict between resources assigned to the UE for a first uplink control channel for transmitting a service request and resources assigned to the UE for a second uplink control channel for transmitting a data acknowledgement;

a transmitter for transmitting a scheduling restriction to the UE, the scheduling restriction requiring selection of single input multiple output (SIMO) when downlink transmission corresponds to a service request subframe; and a receiver for receiving the data acknowledgement multiplexed with the service request, the data acknowledgment and the service request transmitted by the UE on the second uplink control channel using quadrature phase-shift keying (QPSK) modulation;

a de-multiplexer for de-multiplexing the received data acknowledgement and the received service request.

15. An apparatus for de-multiplexing control information, comprising:

a computing platform for determining there is a conflict between resources assigned for a first uplink control channel for transmitting a service request and resources assigned for a second uplink control channel for transmitting a data acknowledgement;

a transmitter for transmitting a scheduling restriction to the UE, the scheduling restriction requiring selection of multiple input multiple output (MIMO) rank one (1) when downlink transmission corresponds to a service request subframe; and
a receiver for receiving the data acknowledgement multiplexed with the service request, the data acknowledgment and the service request transmitted by the UE on the second uplink control channel using quadrature phase-shift keying (QPSK) modulation;
a de-multiplexer for de-multiplexing the received data acknowledgement and the received service request.

* * * * *